BEST AVAILABLE COPY
J. A. Wilkinson
Making Weavers' Reeds.
Patented Jul. 17. 1838
No. 8,974 X
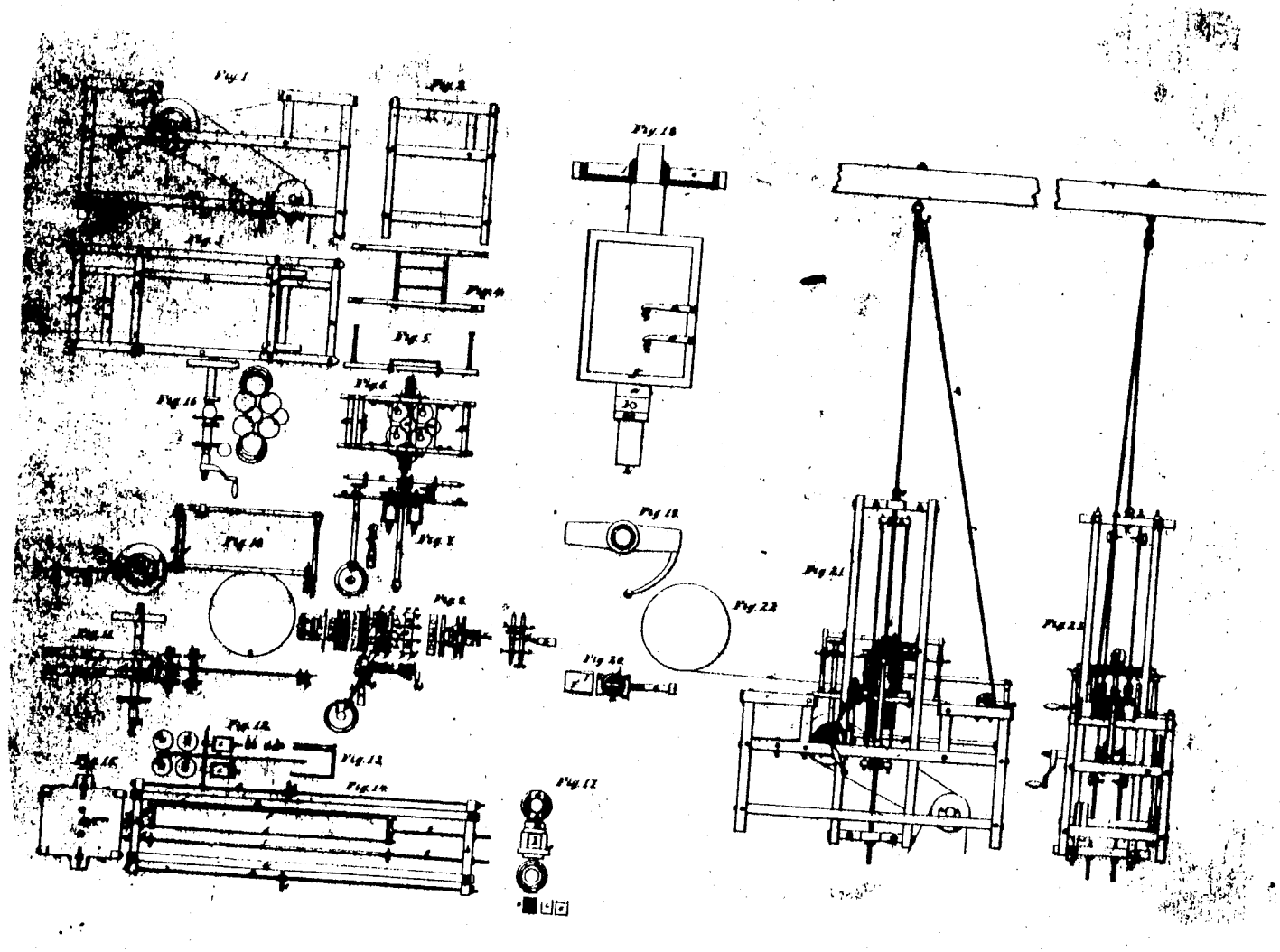

BEST AVAILABLE COPY
Sheet 2, 2 Sheets
J. A. Wilkinson.
Making Weavers' Reeds.
Patented Jul. 17, 1835.
No. 8,974 X
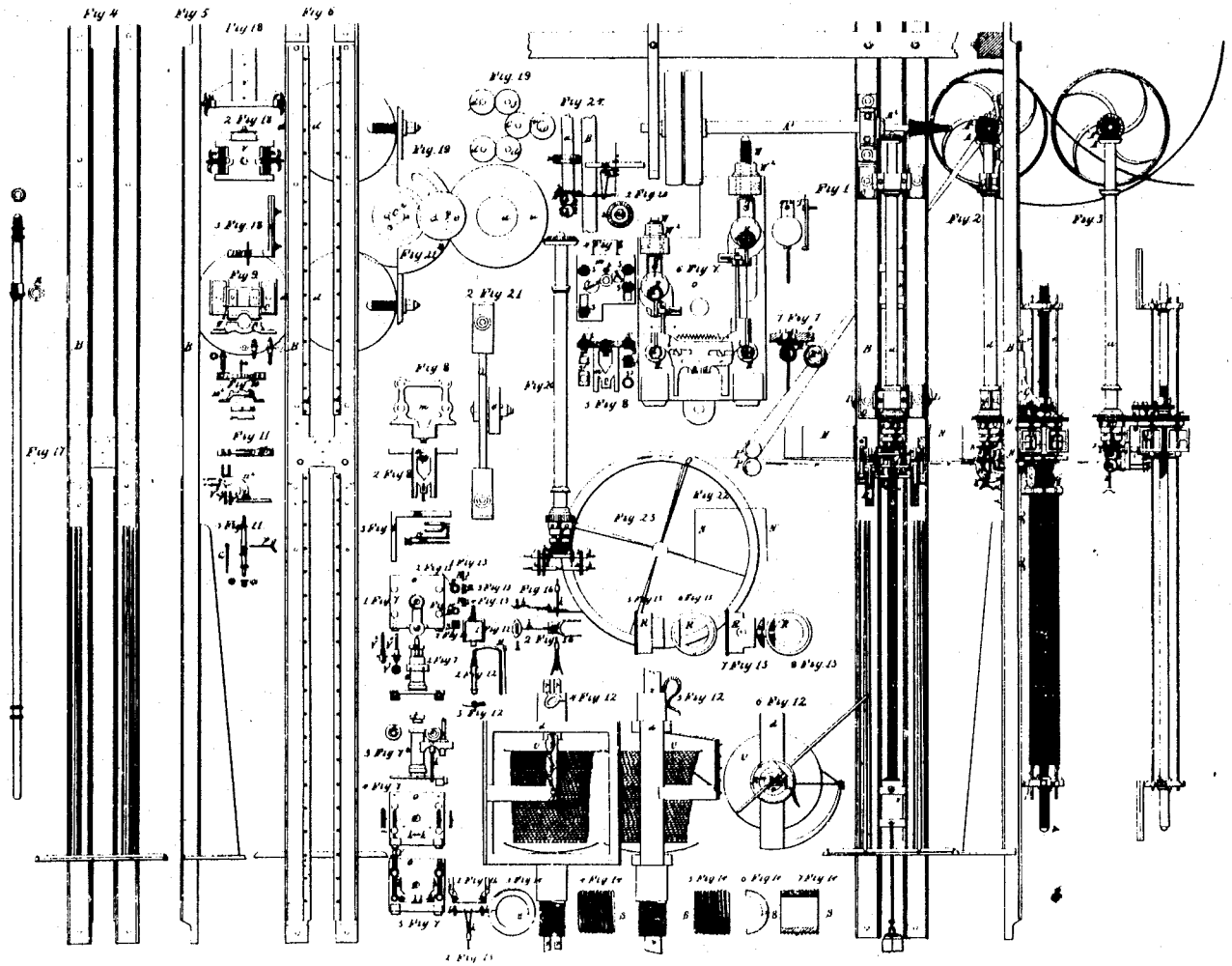
N. PETERS, PHOTO-LITHOGRAPHER, WASHINGTON, D. C.

United States Patent Office

PTO - BOYERS, PA Duty Station

MISSING PAGE TEMPORARY NOTICE

PATENT # X8974 FOR ISSUE DATE 7-17-35

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text

Data Conversion Operation

Boyers, Pa